(12) United States Patent
Goyal et al.

(10) Patent No.: US 11,753,043 B2
(45) Date of Patent: Sep. 12, 2023

(54) PREDICTING CROSSING BEHAVIOR OF AGENTS IN THE VICINITY OF AN AUTONOMOUS VEHICLE

(71) Applicant: Waymo LLC, Mountain View, CA (US)

(72) Inventors: Vishu Goyal, Mountain View, CA (US); Shubham Gupta, Monrovia, CA (US); Kai Ding, Santa Clara, CA (US)

(73) Assignee: Waymo LLC, Mountain View, CA (US)

( * ) Notice: Subject to any disclaimer, the term of this patent is extended or adjusted under 35 U.S.C. 154(b) by 174 days.

(21) Appl. No.: 17/325,952

(22) Filed: May 20, 2021

(65) Prior Publication Data

US 2022/0371624 A1    Nov. 24, 2022

(51) Int. Cl.
*B60W 60/00* (2020.01)
*G05B 13/02* (2006.01)
*G05D 1/02* (2020.01)

(52) U.S. Cl.
CPC ..... *B60W 60/0027* (2020.02); *G05B 13/0265* (2013.01); *G05D 1/0214* (2013.01);
(Continued)

(58) Field of Classification Search
CPC ..... B60W 60/0027; B60W 2554/4041; B60W 2556/10; B60W 2552/53;
(Continued)

(56) References Cited

U.S. PATENT DOCUMENTS 9,248,834 B1 * 2/2016 Ferguson .......... B60W 60/0027
10,625,748 B1 * 4/2020 Dong ................ B60W 30/0956
(Continued)

FOREIGN PATENT DOCUMENTS

DE    102012111846 A1 *  6/2013  ........ B60W 30/0956
DE    102016007899 A1 * 12/2017
DE    102018104270 A1 *  8/2019

OTHER PUBLICATIONS

Berriel et al., "Deep Learning-Based Large-Scale Automatic Satellite Crosswalk Classification," IEEE Geoscience and Remote Sensing Letters, Jul. 2017, 14(9):1513-1517.
(Continued)

*Primary Examiner* — Navid Z. Mehdizadeh
*Assistant Examiner* — Kenneth M Dunne
(74) *Attorney, Agent, or Firm* — Fish & Richardson P.C.

(57) ABSTRACT

Methods, systems, and apparatus, including computer programs encoded on a computer storage medium that generates path prediction data for agents in the vicinity of an autonomous vehicle using machine learning models. One method includes identifying an agent in a vicinity of an autonomous vehicle navigating an environment and determining that the agent is within a vicinity of a crossing zone, which can be marked or unmarked. In response to determining that the agent is within a vicinity of a crossing zone: (i) features of the agent and of the crossing zone can be obtained; (ii) a first input that includes the features can be processed using a first machine learning model that is configured to generate a first crossing prediction that characterizes future crossing behavior of the agent, and (iii) a predicted path for the agent for crossing the roadway can be determined from at least the first crossing prediction.

20 Claims, 4 Drawing Sheets

(52) U.S. Cl.
CPC ..... *B60W 2420/40* (2013.01); *B60W 2552/53* (2020.02); *B60W 2554/4041* (2020.02); *B60W 2554/4044* (2020.02); *B60W 2554/4045* (2020.02); *B60W 2556/10* (2020.02); *G05D 2201/0213* (2013.01)

(58) Field of Classification Search
CPC . B60W 2554/4044; B60W 2554/4045; B60W 2420/40; G05B 13/0265; G05D 1/0214; G05D 2201/0213
See application file for complete search history.

(56) References Cited

U.S. PATENT DOCUMENTS

| | | | | |
|---|---|---|---|---|
| 10,915,762 | B1* | 2/2021 | Russell | G05D 1/0276 |
| 2016/0300485 | A1* | 10/2016 | Ayvaci | G08G 1/166 |
| 2017/0316333 | A1* | 11/2017 | Levinson | G05D 1/0274 |
| 2018/0326982 | A1* | 11/2018 | Paris | B60W 30/18154 |
| 2018/0349714 | A1* | 12/2018 | Sakamoto | G06V 20/58 |
| 2019/0220016 | A1* | 7/2019 | Phillips | B60W 50/0097 |
| 2019/0310632 | A1* | 10/2019 | Nakhaei Sarvedani | G06N 3/08 |
| 2020/0023842 | A1* | 1/2020 | Gutierrez | G06V 40/10 |
| 2020/0110416 | A1* | 4/2020 | Hong | G01C 21/3602 |
| 2020/0207375 | A1* | 7/2020 | Mehta | G06V 20/56 |
| 2020/0307563 | A1* | 10/2020 | Ghafarianzadeh | G06V 20/58 |
| 2021/0001897 | A1* | 1/2021 | Chai | G08G 1/0145 |
| 2021/0053561 | A1* | 2/2021 | Beller | G08G 1/166 |
| 2021/0245744 | A1* | 8/2021 | Mangalam | B60W 30/0956 |
| 2021/0300359 | A1* | 9/2021 | McGill | G06V 40/103 |
| 2021/0347377 | A1* | 11/2021 | Siebert | G06N 5/04 |

OTHER PUBLICATIONS

Dow et al., "A crosswalk pedestrian recognition system by using deep learning and zebra-crossing recognition techniques," Software Practice and Experience, Aug. 2019, 50(2):15 pages.

Jayaraman et al., "Analysis and Prediction of Pedestrian Crosswalk Behavior during Automated Vehicle Interactions," 2020 IEEE International Conference on Robotics and Automation, Aug. 2020, 7 pages.

Lorenzo et al., "RNN-based Pedestrian Crossing Prediction using Activity and Pose-related Features," 2020 IEEE Intelligent Vehicles Symposium, Nov. 2020, 6 pages.

Pop et al., "Multi-Task Deep Learning for Pedestrian Detection, Action Recognition and Time to Cross Prediction," IEEE Access, Oct. 2019, PP(99):1-1.

Ridel et al., "A Literature Review on the Prediction of Pedestrian Behavior in Urban Scenarios," 2018 21st International Conference on Intelligent Transportation Systems, Nov. 2018, pp. 3105-3112.

rsipvision.com [online], "Pedestrian Detection with Machine Learning," Apr. 2016, retrieved on May 17, 2021, retrieved from URL<https://www.rsipvision.com/pedestrian-detection-with-machine-learning/>, 2 pages.

Smirnov et al., "Using multi-agent simulation to predict natural crossing points for pedestrians and choose locations for mid-block crosswalks," Geospatial Big Data for Urban Planning and Urban Management, Nov. 2020, 23(4):362-374.

towardsdatascience.com [online], "Automating Traffic Analysis with Machine Learning," Oct. 2019, retrieved on May 17, 2021, retrieved from URL<https://towardsdatascience.com/automating-traffic-analysis-with-machine-learning-6165a3abecb3>, 2 pages.

Tumen et al., "Intersections and crosswalk detection using deep learning and image processing techniques," Physica A: Statistical Mechanics and its Applications, Apr. 2020, 543:123510.

Varytimidis et al., "Action and Intention Recognition of Pedestrians in Urban Traffic," 2018 14th international Conference on Signal-Image Technology & Internet-Based Systems, Nov. 2018, 6 pages.

Volz et al., "Inferring pedestrian motions at urban crosswalks," Transactions on Intelligent Transportation Systems, May 2018, 20(2):544-55.

Zhang et al., "Pedestrian Path Prediction for Autonomous Driving at Un-Signalized Crosswalk Using W/CDM and MSFM," IEEE Transactions on Intelligent Transportation Systems, May 2021, 22(5):3025-3037.

Zhang et al., "Prediction of Pedestrian Crossing Intentions at Intersections Based on Long Short-Term Memory Recurrent Neural Network," Transportation Research Record Journal of the Transportation Research Board, Mar. 2020, 2674(4):036119812091242.

* cited by examiner

PREDICTING CROSSING BEHAVIOR OF AGENTS IN THE VICINITY OF AN AUTONOMOUS VEHICLE

BACKGROUND

This specification relates to autonomous vehicles.

Autonomous vehicles include self-driving cars, motorcycles, trucks, buses and similar vehicles. Autonomous vehicles use a variety of on-board sensors and computer systems to detect nearby objects and use such detections to make control and navigation decisions.

SUMMARY

This specification describes a system implemented as computer programs on one or more computers in one or more locations that generates path prediction data for agents in the vicinity of an autonomous vehicle. More specifically, this specification describes a system that generates a crossing prediction for a given agent in the vicinity of a crossing zone and can generate path predictions consistent with the crossing prediction. A crossing zone is a region where pedestrians or other agents can cross a roadway and can be marked, such as a crosswalk that is indicated by markings on the roadway or road signs that identify the crossing zone, or unmarked, meaning there are no markings on the roadway or road signs indicating that a crossing zone exists at the crossing location.

Particular embodiments of the subject matter described in this specification can be implemented so as to realize one or more of the following advantages.

The techniques described below can predict the crossing behavior for an agent in or near a crossing zone. Such predictions allow an autonomous vehicle to avoid close interactions with agents, thus increasing the comfort of the surrounding agents and the safety of the operation of autonomous vehicles.

Further, the techniques described below can operate both on marked crossing zones, such as crosswalks, and unmarked crossing zones. Unmarked crossing zones are defined not by markings in the roadway, but rather by the predicted behavior of pedestrians. For example, if pedestrians frequently cross a roadway at a particular location not marked as a crossing zone, the techniques described below will treat the region area as a crossing zone for the purpose of operating an autonomous vehicle, increasing the likelihood that the autonomous vehicle operates safely.

In addition, the techniques described below do not require the agent to remain in the crossing zone throughout the crossing movement. The techniques described below can predict the behavior of agents who traverse the roadway in the vicinity of a crossing zone; enter the roadway outside the crossing zone, then enter the crossing zone; enter the roadway inside the crossing zone, then exit the crossing zone before exiting the roadway; and enter and exit the crossing zone more than once as an agent traverses the roadway. Understanding agent behavior in and around a crossing zone, and beyond agent paths that remain within a crossing zone, can improve the likelihood that an autonomous vehicle performs safely.

The techniques below can further predict the likelihood that an agent will be at a particular location in or near a crossing zone at a particular time. The techniques described below can also determine the current heading of an agent at or near a crossing zone, and predict the offset from the current heading that an agent will follow. Determining the likelihood that an agent is at a particular position at or near a crossing zone at a given time, and determining the agent's heading at or near a crossing zone, allow the autonomous vehicle to plan routes that avoid close proximity to the agent or to adjust the vehicle speed to avoid close proximity to the agent.

One aspect features identifying an agent in a vicinity of an autonomous vehicle navigating through an environment and determining that the agent is within a vicinity of a crossing zone across a roadway. The crossing zone can be a marked crossing zone or an unmarked crossing zone. For example, the crossing zone can be an unmarked crossing zone that has been identified based on previous observations of agents crossing the roadway. In response to determining that the agent is within a vicinity of a crossing zone: (i) features of the agent and of the crossing zone can be obtained; (ii) a first input that includes the features can be processed using a first machine learning model that is configured to generate a first crossing prediction that characterizes future crossing behavior of the agent, and (iii) a predicted path for the agent for crossing the roadway can be determined from at least the first crossing prediction.

One or more of the following features can be included. The first crossing prediction can indicate a first likelihood that the agent will cross the roadway in the crossing zone. Determining the predicted path can include determining that the first likelihood exceeds a threshold likelihood and, in response, determining a predicted path that is entirely within the crossing zone.

The crossing zone can include an entry zone and the first crossing prediction can indicate a first likelihood that the agent will cross the roadway but will first enter the crossing zone outside the entry zone, and the predicted path can be determined by: (i) determining that the first likelihood exceeds a threshold likelihood and, (ii) in response, generating a projected path that intersects the crossing zone outside the entry zone.

The first crossing prediction can indicate a likelihood that the agent will cross the roadway but will not enter the crossing zone, and determining the predicted path can include: (i) determining that the first likelihood exceeds a threshold likelihood, and in response, (ii) generating a projected path that does not enter the crossing zone.

In addition, in response to determining that the projected path does not enter the crossing zone, features of the agent and of the crossing zone can obtained and a second machine learning model can be processed, where the second machine learning model can be configured to generate a path prediction that includes an indication of the distance between the agent and the crossing zone. The second machine learning model can be a regression model.

In some examples, a second input that includes the features can be processed using a second machine learning model that is configured to generate, for each point within a set of points, and at a time within a range of times, a second likelihood that the agent will cross the each point at the time, and a heatmap can be generated that reflects, for the each point, the second likelihood.

In some examples, a third input, which can include a current heading of the agent, can be processed using a third machine learning model that is configured to generate a predicted offset from the current heading.

The current heading and the predicted offset from the current heading can be used to generate a projected path, and using the projected path, to generate a projected exit point from a roadway. The first machine learning model can be trained using historical observations of agents traveling in the vicinity of the crossing zone. The features used in the first machine learning model can include, in any combination, the position of the agent the heading of the agent, the orientation of the crossing zone, the dimension of the crossing zone, the shape of the crossing zone and the position of the agent within the crossing zone.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how an on-board system of an autonomous vehicle can generate crossing predictions for agents in the vicinity of the autonomous vehicle. The agents can be, for example, a pedestrian, a bicyclist, or any other agent that might potentially cross a roadway, e.g., might cross the roadway approximately perpendicular to the direction of travel along the roadway. The on-board system uses the crossing predictions to guide the behavior of the autonomous vehicle.

Understanding the behavior of agents in the vicinity of a crossing zone promotes the safe operation of an autonomous vehicle as crossing zones are, by definition, areas where agents are at an increased likelihood of crossing a roadway.

In addition, some agents do not necessarily respect the boundaries of a crossing zone. While some agents will remain within the crossing zone for the entirety of a crossing, other agents might enter a roadway outside a crossing zone, then merge into the crossing zone. Still other agents might cross in the vicinity of a crossing zone, but never actually enter it. Some agents might enter and exit repeatedly while crossing. Thus, it can be beneficial to predict the behavior of such agents.

Expanding predictions from marked crossing zones, such as crosswalks, to unmarked crossing zones also promotes the safe operation of autonomous vehicles. In some cases, when a nearby crosswalk is unavailable, agents will still cross a roadway. For example, in suburban and rural environments, marked crossing zones can be uncommon, yet agents still must cross from one side of a road to another, and using a marked crossing zone can be impractical or even impossible. Thus, the ability to predict agent behavior in proximity to an unmarked crossing zone is beneficial to the safe operation of an autonomous vehicle.

In particular, the on-board system can generate a crossing prediction by obtaining features of the agent, of a crossing zone and of the roadway, and using those features as input to one or more machine learning models that each generate a prediction that characterizes the predicted crossing behavior of the agent. The on-board system can then use the crossing predictions to determine a predicted path for the agent.

The on-board system can use the predicted path prediction to perform actions, i.e., to control the vehicle, which causes the vehicle to operate more safely. For example, the on-board system can generate fully-autonomous control outputs to apply the brakes of the vehicle to avoid a collision with an agent crossing the road if the crossing prediction data indicate that the agent is likely to cross the road in or around a crossing zone that is in proximity to the vehicle.

These features and other features are described in more detail below.

Figure 1:
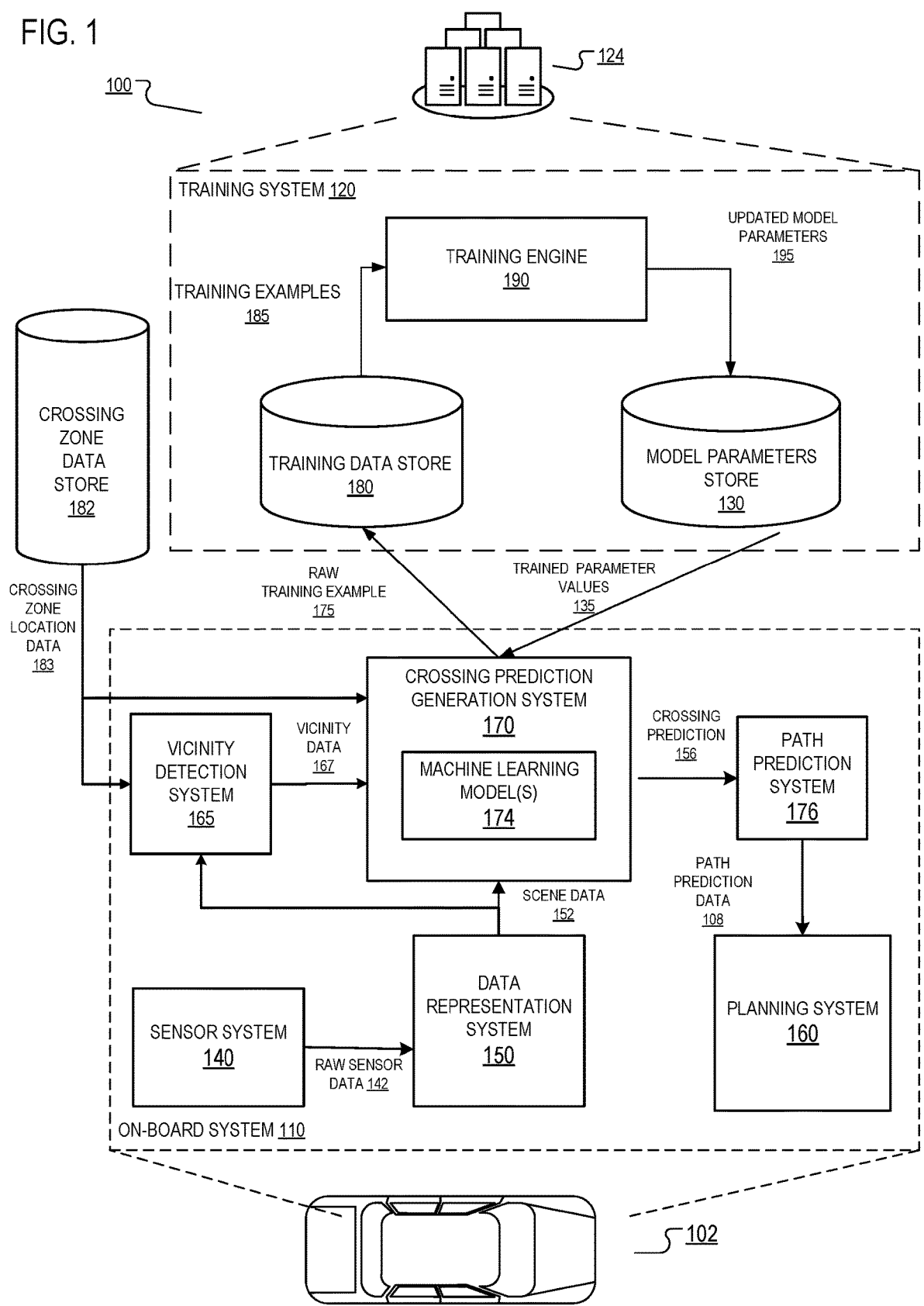
FIG. 1 is a block diagram of an example on-board system.

FIG. 1 is a block diagram of an example on-board system 110 and a training system 120.

The on-board system 110 is located on-board a vehicle 102 and is responsible for safely navigating the vehicle in the environment. Accordingly, it includes components used to detect and understand the environment, then to plan a safe path. The on-board system 110 is composed of hardware and software components, some or all of which are physically located on-board a vehicle 102. The components of the on-board system 110 are described in more detail below.

In some cases, the on-board system 110 can make fully-autonomous or partly-autonomous driving decisions (i.e., driving decisions taken independently of the driver of the vehicle 102), present information to the driver of a vehicle 102 to assist the driver in operating the vehicle safely, or both. For example, in response to determining that an agent is unlikely to yield for the vehicle 102, the on-board system 110 may autonomously apply the brakes of the vehicle 102 or otherwise autonomously change the trajectory of the vehicle 102 to prevent a collision between the vehicle 102 and the agent.

Although the vehicle 102 in FIG. 1 is depicted as an automobile, and the examples in this document are described with reference to automobiles, in general the vehicle 102 can be any kind of vehicle. For example, besides an automobile, the vehicle 102 can be another kind of autonomous vehicle that travels along a roadway, e.g., a truck or a motorcycle. Moreover, the on-board system 110 can include components additional to those depicted in FIG. 1 (e.g., a collision detection system or a navigation system).

To enable the safe control the autonomous vehicle 102, the on-board system 110 includes a sensor system 140 which enables the on-board system 110 to "see" the environment in the vicinity of the vehicle 102. More specifically, the sensor system 140 includes one or more sensors, some of which are configured to receive reflections of electromagnetic radiation from the environment in the vicinity of the vehicle 102. For example, the sensor system 140 can include one or more laser sensors (e.g., LIDAR laser sensors) that are configured to detect reflections of laser light. As another example, the sensor system 140 can include one or more radar sensors that are configured to detect reflections of radio waves. As another example, the sensor system 140 can include one or more camera sensors that are configured to detect reflections of visible light.

The sensor system 140 continually (i.e., at each of multiple time points) captures raw sensor data which can indicate the directions, intensities, and distances travelled by reflected radiation. For example, a sensor in the sensor system 140 can transmit one or more pulses of electromagnetic radiation in a particular direction and can measure the intensity of any reflections as well as the time that the reflection was received. A distance can be computed by determining the time which elapses between transmitting a pulse and receiving its reflection. Each sensor can continually sweep a particular space in angle, azimuth, or both. Sweeping in azimuth, for example, can allow a sensor to detect multiple objects along the same line of sight. The sensor subsystems 140 can also include a combination of components that receive reflections of electromagnetic radiation, e.g., lidar systems that detect reflections of laser light, radar systems that detect reflections of radio waves, and camera systems that detect reflections of visible light.

The sensor subsystems 140 or other components of the vehicle 102 can also classify groups of one or more raw sensor measurements from one or more sensors as being measures of another agent in the environment. A group of sensor measurements can be represented in any of a variety of ways, depending on the kinds of sensor measurements that are being captured. For example, each group of raw laser sensor measurements can be represented as a three-dimensional point cloud, with each point having an intensity and a position. In some implementations, the position is represented as a range and elevation pair. Each group of camera sensor measurements can be represented as an image patch, e.g., an RGB image patch.

Once the sensor subsystems 140 classify one or more groups of raw sensor measurements as being measures of respective other agents, the sensor subsystems 140 can compile the raw sensor measurements into a set of raw data 142, and send the raw data 142 to a data representation system 150.

The data representation system 150, also on-board the vehicle 102, receives the raw sensor data 142 from the sensor system 140 and additional data that characterizes the environment, i.e., roadgraph data that identifies lanes and marked crossing zones within roadways in the environment and generates scene data 152 that includes features that characterize the agents and environment in the vicinity of the vehicle 102.

The on-board system can augment the data available from the sensor system 140 by accessing data available in data repositories stored within the autonomous vehicle 102, or data repositories outside of, but coupled to, the autonomous vehicle, such as in a data center with the data available made to the autonomous vehicle over a cellular or other wireless network.

For example, the on-board system 110 can retrieve, from a crossing zone data store 182 crossing zone location data 183 that indicates the location of crossing zones. The on-board system 110 can provide crossing zone location data 183 to the vicinity detection system 165 and to a crossing prediction generation system 170. Crossing zone location data 183 can include the locations and shapes of crossing zones. As noted above, the crossing zone data store 182 can be stored in a data center 124 housing the training system 120, in a different data center, or in the vehicle 102.

The crossing zone data store 182 can obtain crossing zone location data 183 from a user. For example, a user can demarcate crossing zone location data 183 for a crossing zone by drawing the boundaries of the crossing zone on an on-line map. Alternatively, logs containing data descriptive of prior crossing behavior can be analyzed using conventional techniques to determine the location of crossing zones.

For example, the system 100 can determine whether the rate of crossing through a potential unmarked crossing zone is above a configured threshold, and if so, determine the existence of an unmarked crossing zone. In this example, the rate of crossing can be defined as the number of crossings through the potential unmarked crossing zone divided by the number of agents who were observed to be in proximity to the potential unmarked crossing zone.

In addition or alternatively, the system 100 can determine whether the number of crossings through a potential unmarked crossing zone is above a configured threshold over a configured period of time, such as one day, and if so, determine the existence of an unmarked crossing zone. In this example, the number of crossings can be defined as the number of crossings through the potential unmarked crossing zone divided by the configured period of time.

The data representation system 150 can provide the scene data 152 to a vicinity detection system 165, also on-board the vehicle 102. In addition, the vicinity detection system 165 can retrieve crossing zone location data 183 from the crossing zone data store 182.

For each agent that has been identified in the environment, the vicinity detection system 165 can use the scene data 152, together with crossing zone location data 183, to determine whether the agent is in the vicinity of a crossing zone. The vicinity detection system 165 can create vicinity data 167 that can include an indication of which crossing zones are within the vicinity of the agent.

The crossing prediction generation system 170 can process input derived from the features in the scene data 152 and vicinity data 167 using each of one more machine learning models. Each machine learning model can generate an output that characterizes a crossing behavior of the agent. For example, one machine learning model 174 can create an indication of whether or not an agent will cross the roadway entirely within a crossing zone. If such a machine learning model 174 indicates that the probability of a crossing within a crossing zone exceeds a threshold, the crossing prediction 156 can include an indication of crossing entirely within the crossing zone. Alternatively or in addition, the crossing prediction 156 can include the actual probability generated by the machine learning model 174.

The crossing prediction 156 can include indications generated from outputs of other machine learning models. For example, the crossing prediction 156 can include an indication that the agent will begin outside the crossing zone, and merge into the crossing zone. The crossing prediction can include an indication the agent will cross outside, but within the vicinity of, the crossing zone. The crossing prediction can also include a prediction that the agent will not cross in the vicinity of the crossing zone. The crossing prediction can also include a set of probability values indicating the probability that the agent will be at a particular point in space at a particular moment in time. The crossing prediction can also include similar predictive indicators, and any combination of the indications listed. The crossing predictions will be discussed in more detail below with reference to FIGS. 2-4.

The machine learning model 174 can be any appropriate type of machine learning model that can map a set of features to a score. For example, the machine learning model 174 that determines the probability of a crossing within a crossing zone can be a classification model such as a logistic regression model or a decision tree. The machine learning models 174 are described in greater detail in reference to FIGS. 3 and 4.

Examples of features used by one or more machine learning models can include the type of agent (e.g., cyclist, pedestrian, etc.), motion curvature of the agent's current trajectory, history of positions along the agent's current trajectory, agent heading, history of heading, agent speed, history of speed, agent acceleration, the heading of the crossing zone, difference between headings of the agent and the crossing zone; the type of intersection (e.g., two-way, four-way, etc.), and so on.

A path prediction system 176 on-board the vehicle receives the crossing prediction 156 for each target agent and uses the crossing prediction 156 to generate path prediction data 108 for each agent.

The on-board system 110 can continually generate path prediction data 108 for agents in the vicinity of the vehicle 102, for example, at regular intervals of time (e.g., every 0.1 seconds). The on-board system 110 can provide the behavior prediction data 108 to a planning system 160.

When the planning system 116 receives the path prediction data 108, the planning system 160 can use the path prediction data 108 to make fully-autonomous driving decisions, i.e., to update a planned trajectory for the vehicle 102. For example, the planning system 160 can generate a fully-autonomous plan to navigate the vehicle 102 to avoid a collision with an agent at or near a crossing zone by changing the future trajectory of the vehicle 102 to avoid the agent. In a particular example, the on-board system 110 may provide the planning system 160 with data indicating that an agent will enter the roadway at a crossing zone in a roadway being travelled by the vehicle 102. In this example, the planning system 160 can generate fully-autonomous control outputs to apply the brakes of the vehicle 102 to avoid a collision with the agent.

The fully-autonomous driving decisions generated by the planning system 160 can be implemented by a control system of the vehicle 102. For example, in response to receiving a fully-autonomous driving decision generated by the planning system 160 which indicates that the brakes of the vehicle should be applied, the control system may transmit an electronic signal to a braking control unit of the vehicle. In response to receiving the electronic signal, the braking control unit can mechanically apply the brakes of the vehicle.

Thus, because the path prediction data 108 is informed by the crossing prediction generation system 170 and is used by the planning system 160 to plan the driving of the vehicle 102, the on-board system 110 can generate improved crossing predictions 156 that can result in improved performance of the vehicle 102.

The training system 120, which is associated with the on-board system 110, is responsible for creating trained parameter values 135 used by the on-board system 102 in one or more machine learning models 174.

The training system 120 includes a training data store 180 that stores the training data used to train the parameter values of each of the machine learning model 174. The training data store 180 receives raw training examples from vehicles operating in the real world. For example the training data store 180 can receive a raw training example 175 from the vehicle 102 and one or more other agents that are in communication with the training system 120. Each raw training example 175 can be processed by the training system 120 to generate a new training example used to train one or more machine learning models 174. The raw training examples 175 include a model input for at least one machine learning model 174. The raw training example 175 also includes outcome data characterizing the crossing behavior (relevant to the corresponding machine learning model) of the target agent that is the subject of the model input. This outcome data can be used to generate and label a training example for one or more of the machine learning models 174. For example, for a classification model that determines whether an agent will cross the roadway in the vicinity of a crossing zone, the training example can be labeled as either a positive training example or a negative training example. Alternatively or in addition, the outcome data can be used to generate a score or a probability distributions over locations, and these outcome data and associated scores or probability distributions can be used as training examples for one or more machine learning models 174.

The training data store 180 provides training examples 185 to a training engine 190, also housed in the training system 120. The training engine uses the training examples 185 to update the model parameters of the machine learning model 174, and provides the updated model parameters 195 to the model parameters store 130. Once the parameter values of the model 174 have been fully trained, the training system 120 can send the trained parameter values 135 to the on-board system 110, e.g., through a wired or wireless connection.

The training system 120 is typically hosted within a data center 124, which can be a distributed computing system having hundreds or thousands of computers in one or more locations.

Figure 2:
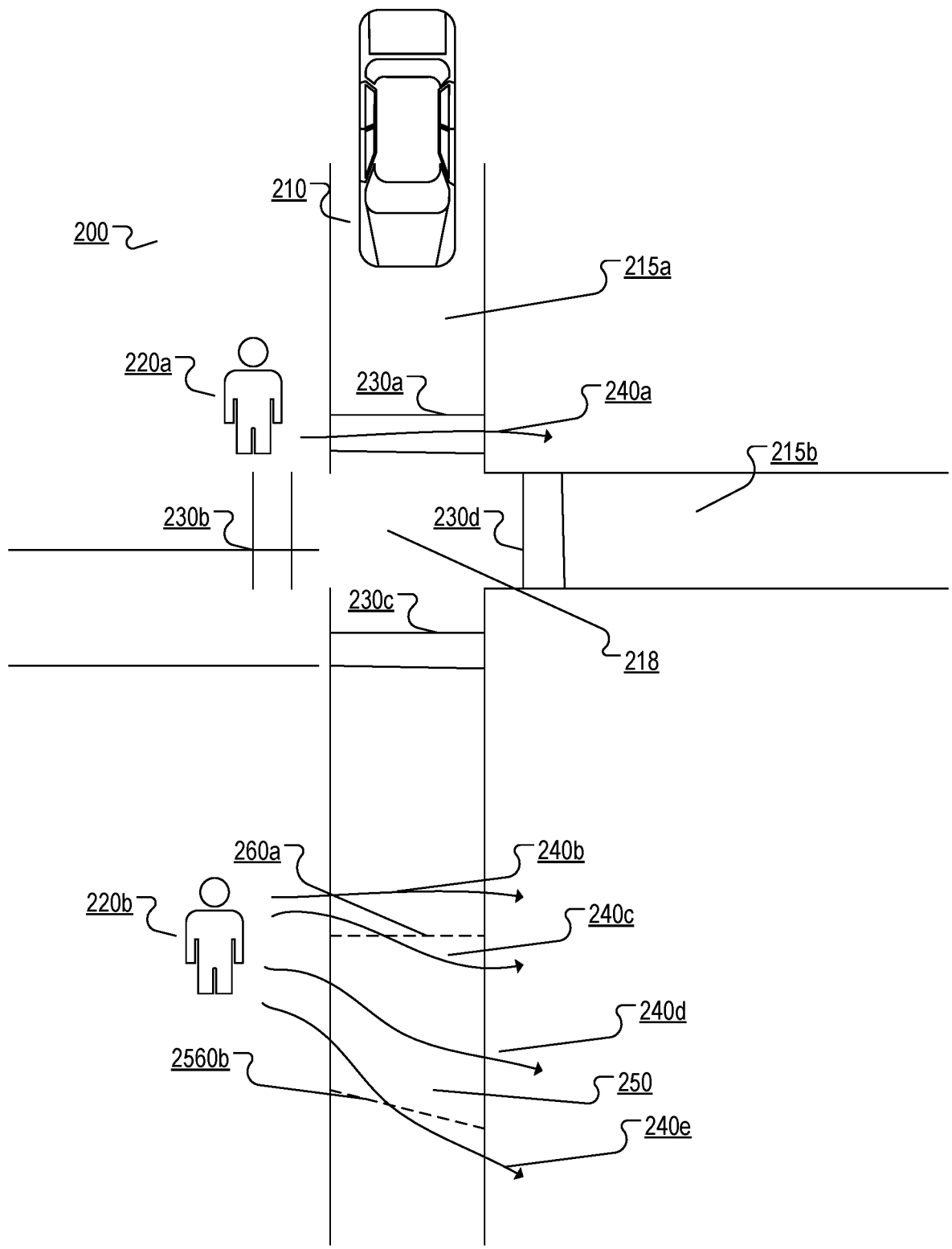
FIG. 2 is an illustration of roadway system.

FIG. 2 is an illustration of example roadway system. An autonomous vehicle 210 is following a segment of roadway 215a and approaching an intersection 218 with a second roadway 215b. As the four segments of roadway approach the intersection 218, there are four marked crosswalks 230a-d. An agent 220a can cross the roadway segment 215a using marked crosswalk 230a following path 240a.

If the autonomous vehicle 210 continued on the roadway 215 across the intersection 218, it would arrive in the vicinity of a second agent 220b. In this case, no marked crosswalk is in the vicinity of the agent. However, there is an unmarked crossing zone 250 with an upper boundary 260a and lower boundary 260b in the vicinity of the agent 220b.

FIG. 2 illustrates four types of paths the agent 220b can use to cross the roadway 215a at or in the vicinity of a crossing zone: (i) crossing entirely outside the crossing zone 240b, (ii) beginning to cross outside the crossing zone then entering the crossing zone 240c, (iii) crossing entirely within the crossing zone 240d, and (iv) beginning to cross within the crossing zone then exiting the crossing zone 240e. Each of these paths can result in the system executing one or more machine learning models. (More complex paths are possible and are described in reference to FIG. 4.)

For example, the system can execute a first machine learning model that predicts whether the agent 220b will cross entirely within a crossing zone, such as in path 240d.

If instead, a first machine learning model predicts that an agent 220b will not cross the roadway 215a entirely within the crossing zone 250, a second machine learning model can predict that the agent will begin crossing the roadway outside the crossing zone, such as in paths 240b and 240c. After the second machine learning model predicts that the agent will begin crossing the roadway outside the crossing zone, a third machine learning model can predict whether the agent will remain outside the crossing zone (path 240b) or enter the crossing zone (240c).

In an alternate example, after a first machine learning model predicts that an agent 220b will not cross the roadway 215a entirely within a crossing zone, another machine learning model can predict that the agent will begin crossing the roadway within the crossing zone then exit the crossing zone, such as in path 240e.

In all such cases, after executing one or more machine learning models to predict the characteristics of the agent's path, the system can generate a path prediction corresponding to the predicted path characteristics.

While these crossing alternatives are illustrated with respect to the pedestrian crossing the unmarked crossing zone 250, the system can make analogous predictions for the agent 220a crossing the marked crossing zone 230a. Further note that the order of predictions described above is merely one example, and other orders can be used.

Figure 3:
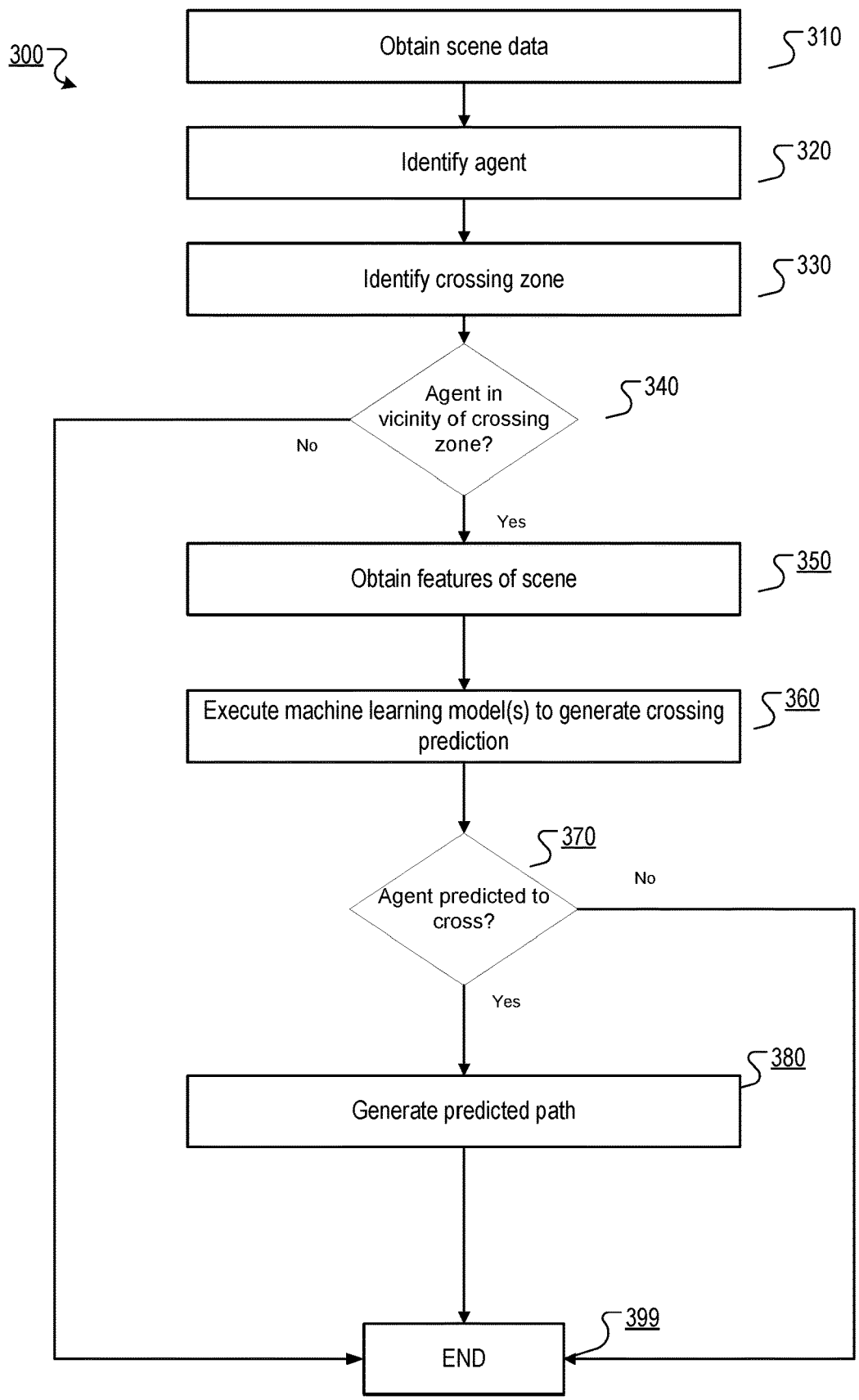
FIGS. 3 and 4 are flow diagrams of example processes for generating crossing predictions.

FIG. 3 is a flow diagram of an example process 300 for generating predicted paths for a target agent in the vicinity of a crossing zone. For convenience, the process 300 will be described as being performed by a system of one or more computers located in one or more locations. For example, an on-board system, e.g., the on-board system 110 of FIG. 1, appropriately programmed in accordance with this specification, can perform the process 300.

In step 310, the system obtains scene data. Scene data can be obtained from the data representation system of FIG. 1 and can identify agents and their positions, among other information described below. The scene in the environment includes an autonomous vehicle navigating through the environment and one or more other agents including the target agent. The target agent can be, for example, a cyclist or a pedestrian.

In step 320, the system identifies at least one agent in the vicinity of the vehicle by extracting information about agents and positions from the scene data of step 310.

In step 330, the system identifies one or more crossing zones in the vicinity of the vehicle and their locations. For example, the crossing zones, including either or both of marked and unmarked crossing zones, can be obtained from the crossing zone data store of FIG. 1.

In step 340, the system determines whether a crossing zone is in the vicinity of the agent. From step 320, the system has obtained the position of the agent, and from step 330, the system has obtained the location of crossing zones. The system can then determine the Pythagorean distance between the agent and each point in each crossing zone. If the minimum Pythagorean distance between the agent and a point in a crossing zone is lower than a threshold distance, the agent is deemed to be within the vicinity of that crossing zone. If the agent is within the vicinity of the crossing zone, the system executes step 350; otherwise, the system completes its processing (step 399).

In step 350, the system obtains the features of the scene from the scene data, including feature data characterizing the target agent and feature data characterizing the crossing zone. As described previously, feature data characterizing the agent can include, for example, agent type (vehicle, cyclist), agent speed, agent heading, agent acceleration, motion curvature of the agent's current trajectory, history of positions along the agent's current trajectory, history of speed, history of heading, and so on. Feature data characterizing the crossing zone can include the absolute position of the starting points of the crossing zone, the absolute position of the ending points of the crossing zone, the shape of the crossing zone, the relative position of the crossing zone and one or more nearby intersections, and so on.

In step 360, the system processes the features, including the features of the agent, the scene and the crossing zone, using one or more machine learning models to generate a crossing prediction. The models and their predictions are described in more detail in reference to FIG. 4.

In decision step 370, the system uses the output of the machine learning model(s) of step 360 to determine whether the agent will cross the roadway. If the system determines that the agent will cross the roadway, the system executes step 380. If the system determines that the agent will not cross the roadway, this evaluation by the system ends (399).

Figure 4:
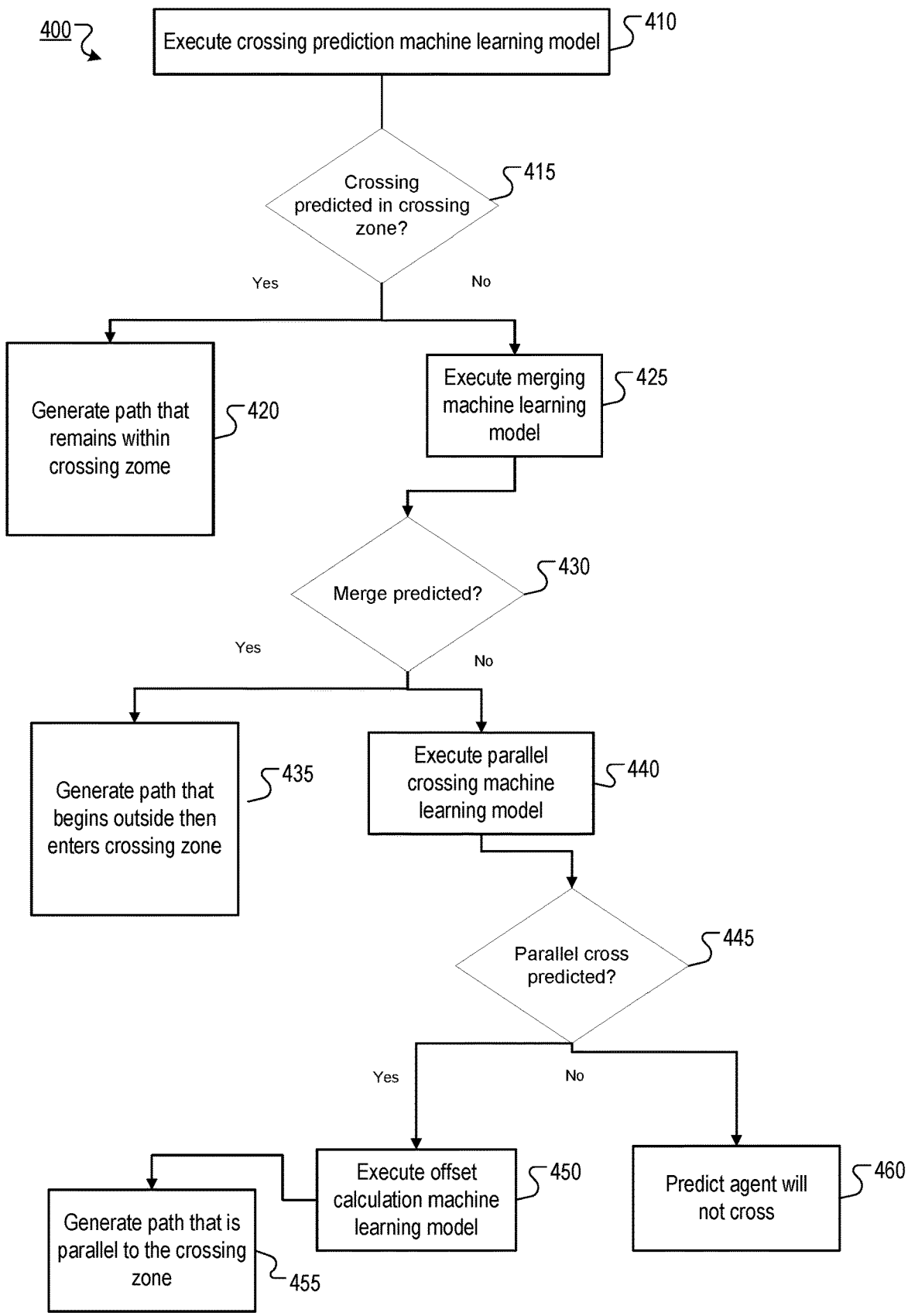

In step 380, the system can use the prediction of the agent's crossing behavior to generate a predicted path using conventional path prediction techniques, as described further in reference to FIG. 4.

In step 399, the system completes the process.

FIG. 4 is a flow diagram of an example process 400 for generating predicted paths for a target agent in the vicinity of a crossing zone using chained machine learning models. For convenience, the process 400 will be described as being performed by a system of one or more computers located in one or more locations. For example, an on-board system, e.g., the on-board system 110 of FIG. 1, appropriately programmed in accordance with this specification, can perform the process 400.

In step 410, the system processes an input using a trained crossing prediction model. The crossing prediction model can be any appropriate type of machine learning model, for example, a binary classification machine learning model such as a decision tree, a generalized linear model, a multi-layer perceptron (MLP) or other neural network, and so on. Features used by the machine learning model can include the agent heading, the heading of the crossing zone, difference between headings of the agent and the crossing zone; the type of intersection (e.g., two-way, four-way, etc.), the type of agent (e.g., cyclist, pedestrian, etc.), and so on. The output of a model is a value corresponding to the likelihood that the agent will cross the roadway entirely within the crossing zone.

In step 415, the system determines whether the agent will cross the roadway entirely within in the crossing zone. The system applies a configurable threshold to the output of the machine learning model (produced in step 410), and if the value output by the machine learning model is equal to or above the threshold, the system determines that the agent will cross the roadway entirely within crossing zone and proceeds to step 420. Conversely, if the value output by the machine learning model is below the threshold, the system determines that the agent will not cross entirely within the crossing zone and proceeds to step 425.

In step 420, the system has determined that the crossing path will remain in the crossing zone, and generates a corresponding path entirely within the crossing zone. The path generation can be accomplished by the system 100 of FIG. 1, and more specifically, the path prediction system 176. The path prediction system can generate the candidate future trajectory from a path hypothesis using any of a variety of conventional motion planning techniques. Examples of motion planning techniques include pure pursuit algorithms for path tracking, recurrent neural network models trained using supervised learning, non-linear optimization techniques, iLQR (iterative linear quadratic regulator) trajectory optimization, and so on.

In step 425, the system has determined instead that the path will not be entirely within the crossing zone, and in response, executes a trained merge prediction model to determine whether the agent will begin crossing outside the crossing zone, then merge into the crossing zone. The merge prediction model can be any appropriate type of machine learning model, for example, a binary classification machine learning model such as a decision tree, a generalized linear model, a multi-layer perceptron (MLP) or other neural network, and so on. Features used by the machine learning model can include the agent heading, the heading of the crossing zone, difference between headings of the agent and the crossing zone; the type of intersection (e.g., two-way, four-way, etc.), the type of agent (e.g., cyclist, pedestrian, etc.), and so on. The merge prediction model produces a value corresponding to the likelihood that the agent will begin outside the crossing zone and merge into the crossing zone.

In step 430, the system determines whether the agent will merge into the crossing zone. A configurable threshold can be applied to the output of the machine learning model (produced in step 425), and if the value output by the machine learning model is equal to or above the threshold, the system determines that the agent will merge into crossing zone and proceeds to step 435. Conversely, if the value output from the machine learning model of step 425 is below the threshold, the system determines that the agent will not merge into the crossing zone and proceeds to step 440.

In step 435, the system has determined that the path begins outside the crossing zone and merges into the crossing zone, and the system generates a corresponding path that crosses into crossing zone. The path generation can be accomplished by the system 100 of FIG. 1, and more specifically, the path prediction system 176, that was described in more detail with reference to step 420.

Optionally, and not illustrated, before generating a path, the system can execute additional machine learning models that produce further predictions regarding the agent's path. For example, the system can execute a machine learning model that determines whether the agent will cross back out of the crossing zone. The "cross back out" prediction model can be any appropriate type of machine learning model, for example, a binary classification machine learning model such as a decision tree, a generalized linear model, a multi-layer perceptron (MLP) or other neural network, and so on. Features used by the machine learning model can include the agent heading, the heading of the crossing zone, difference between headings of the agent and the crossing zone; the type of intersection (e.g., two-way, four-way, etc.), the type of agent (e.g., cyclist, pedestrian, etc.), and so on. The output of the "cross back out" prediction model is a score, which the system can compare to a configured threshold to determine whether the agent cross out of a crossing zone that the agent has previously entered.

Subsequently, and again optionally, the system can execute another machine learning model, such as the machine learning model described in reference to step 425, to determine whether the agent, having entered then exited the crossing zone, will cross back into the crossing zone. More generally, the system can optionally use, in various combinations, sequences of machine learning models such as the machine learning models described in this specification and similar machine learning models operating on the same features as described, to make more precise predictions about agent crossing behavior in and around a crossing zone.

Conversely, some of the machine learning models illustrated in FIG. 4 can optionally be omitted and/or other models applied. For example, after step 415, the system has determined whether the agent will cross entirely within the crossing zone. Rather than executing the machine learning model of step 425, the system can execute a machine learning model that determines whether the agent will cross the roadway nearby the crossing zone. (Not shown.) The "cross near crossing zone" prediction model can be any appropriate type of machine learning model, for example, a binary classification machine learning model such as a decision tree, a generalized linear model, a multi-layer perceptron (MLP) or other neural network, and so on, and use the same features as described in reference to the machine learning model of step 410. By comparing a score produced by that model to a configured threshold, the system can determine either that the agent will not cross the roadway, or that the agent will cross the roadway, but will not cross entirely within the crossing zone. In the latter case, the system can execute a path prediction system similar to the one described in reference to step 420, but configured to generate a path in which the agent crosses the roadway, but not entirely within the crossing zone.

Returning to FIG. 4, in step 440, the system has determined that the path will begin outside the crossing zone and will not cross into the crossing zone, and in response, executes a trained parallel crossing prediction model to determine whether the agent will cross the crossing zone using a path in the vicinity of the crossing zone, but outside the crossing zone. (While the term "parallel" is used, the path need not be straight nor precisely parallel to an edge of the crossing zone. In this specification, the term "parallel" is used to mean that two paths remain nearby each other and do not cross or intersect.)

The parallel crossing prediction model can be any appropriate type of machine learning model, for example, a binary classification machine learning model such as a decision tree, a generalized linear model, a multi-layer perceptron (MLP) or other neural network, and so on. Features used by the machine learning model can include the agent heading, the heading of the crossing zone, difference between headings of the agent and the crossing zone; the type of intersection (e.g., two-way, four-way, etc.), the type of agent (e.g., cyclist, pedestrian, etc.), and so on. The parallel crossing prediction model produces a value corresponding to the likelihood that the agent will follow a path outside of, but parallel to, the crossing.

In step 445, the system determines whether the agent will cross the crossing zone using a path that is outside, but parallel to, the crossing zone. A configurable threshold is applied to the output of the machine learning model (produced in step 440), and if the value output by the machine learning model is equal to or above the threshold, the system determines that the agent will cross using a parallel path and proceed to step 450. Conversely, if the value output by the machine learning model is below the threshold, the system determines that the agent will not begin crossing in the crossing zone and proceeds to step 455.

In step 450, the system has determined that the agent will cross using a path that is parallel to the crossing zone, and in response, executes an offset calculation prediction model to determine the offset the agent will have from crossing zone at each point (or a subset of the points) of the crossing. The offset calculation prediction model can be a conventional trained regression machine learning model. Alternatively, repeated applications of a trained neural network can be used to predict the offset from the crossing zone as the agent crosses the roadway. Features used by the machine learning models can include the agent heading, the heading of the crossing zone, difference between headings of the agent and the crossing zone; the type of intersection (e.g., two-way, four-way, etc.), the type of agent (e.g., cyclist, pedestrian, etc.), and so on. The offset calculation prediction model can generate a predicted, regressed offset value that represents, for each point (or at a subset of the points) of the crossing, an offset (such as a Cartesian distance) between the nearest point of the crossing zone and the point in the path of the agent while crossing the roadway.

In step 455, the system has determined that the path is parallel to the crossing zone and generates a corresponding path using the offset predictions generated in step 450. The path generation can be accomplished by the system 100 of FIG. 1, and more specifically, the path prediction system 176, as described in more detail with reference to step 420.

In step 460, the system, having executed the machine learning models of steps 410, 425 and 440, predicts that the agent will not cross the roadway within the crossing zone, parallel to the crossing zone, or crossing into the crossing zone.

In addition, optionally, and not shown, the system can execute one or more location likelihood machine learning models. When the system executes the location likelihood machine learning model(s), the output can be a series of values representing the likelihood that the agent will be at a particular point in space at a particular point in time, such as 10 seconds in the future. By executing the model(s), the system can create a "heatmap" representing the agent's most-likely locations at the future point in time. The system can also execute the model(s) repeatedly for different points in time to create a heatmap representing the most likely paths in and around a crossing zone.

The location likelihood machine learning models can each be conventional trained regression machine learning models. Alternatively, repeated applications of a trained neural network can be used to predict the likelihood the agent is at a location within the crossing zone as the agent crosses the roadway. Features used by the machine learning models can include the agent heading, the heading of the crossing zone, difference between headings of the agent and the crossing zone; the type of intersection (e.g., two-way, four-way, etc.), the type of agent (e.g., cyclist, pedestrian, etc.), and so on.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of determining a path of an agent, the method comprising:
   identifying an agent in a vicinity of an autonomous vehicle navigating through an environment;
   determining that the agent is within a vicinity of a crossing zone across a roadway; and
   in response:
      obtaining features of (i) the agent and (ii) the crossing zone;
      processing a first input comprising the features using a first machine learning model that is configured to generate a first crossing prediction that characterizes future crossing behavior of the agent and that indicates a likelihood that the agent will cross the roadway but will not cross in the crossing zone; and
      processing a second input comprising the features using a second machine learning model that is configured to generate a path prediction for the agent, wherein the path prediction includes an indication of the distance between the agent and the crossing zone while the agent is crossing the roadway.

2. The method of claim 1, wherein processing the second input comprises:
   processing the second input in response to: determining that the likelihood exceeds a threshold likelihood.

3. The method of claim 1 wherein the second machine learning model is a regression model.

4. The method of claim 1 further comprising:
   processing a third input comprising the features using a third machine learning model that is configured to generate, for each point within a set of points, and at a time within a range of times, a second likelihood that the agent will cross the point at the time; and generating a heatmap that reflects, for each point within the set of points, the second likelihood.

5. The method of claim 1, wherein at least one feature comprises a current heading of the agent, the method further comprising:
processing a third input comprising the features, using a third machine learning model that is configured to generate a predicted offset from the current heading.

6. The method of claim 5 further comprising:
combining the current heading and the predicted offset from the current heading to generate a projected path; and
generating, using the projected path, a projected exit point from a roadway.

7. The method of claim 1 wherein the features used in the first machine learning model include the position of the agent.

8. The method of claim 1 wherein the features used in the first machine learning model include a heading of the agent.

9. The method of claim 1 where the features include the orientation of the crossing zone.

10. The method of claim 1 where the feature include a dimension of the crossing zone.

11. The method of claim 1 where the features include a shape of the crossing zone.

12. The method of claim 1 where the features include a position of the agent within the crossing zone.

13. The method of claim 1 wherein the first machine learning model is trained using historical observations of agents traveling in the vicinity of the crossing zone.

14. One or more non-transitory computer-readable storage media storing instructions that when executed by one or more computers cause the one or more computers to perform operations comprising:
identifying an agent in a vicinity of an autonomous vehicle navigating through an environment;
determining that the agent is within a vicinity of a crossing zone across a roadway; and
in response:
obtaining features of (i) the agent and (ii) the crossing zone;
processing a first input comprising the features using a first machine learning model that is configured to generate a first crossing prediction that characterizes future crossing behavior of the agent and that indicates a likelihood that the agent will cross the roadway but will not cross in the crossing zone; and
processing a second input comprising the features using a second machine learning model that is configured to generate a path prediction for the agent, wherein the path prediction includes an indication of the distance between the agent and the crossing zone while the agent is crossing the roadway.

15. The one or more non-transitory computer-readable storage media of claim 14 wherein processing the second input comprises:
processing the second input in response to determining that the likelihood exceeds a threshold likelihood.

16. A system comprising one or more computers and one or more storage devices storing instructions that when executed by the one or more computers cause the one or more computers to perform operations comprising:
identifying an agent in a vicinity of an autonomous vehicle navigating through an environment;
determining that the agent is within a vicinity of a crossing zone across a roadway; and
in response:
obtaining features of (i) the agent and (ii) the crossing zone;
processing a first input comprising the features using a first machine learning model that is configured to generate a first crossing prediction that characterizes future crossing behavior of the agent and that indicates a likelihood that the agent will cross the roadway but will not cross in the crossing zone; and
processing a second input comprising the features using a second machine learning model that is configured to generate a path prediction for the agent, wherein the path prediction includes an indication of the distance between the agent and the crossing zone while the agent is crossing the roadway.

17. The system of claim 16, wherein processing the second input comprises:
processing the second input in response to determining that the likelihood exceeds a threshold likelihood.

18. The system of claim 16, the operations further comprising:
processing a third input comprising the features using a third second machine learning model that is configured to generate, for each point within a set of points, and at a time within a range of times, a second likelihood that the agent will cross the point at the time; and
generating a heatmap that reflects, for each point within the set of points, the second likelihood.

19. The system of claim 16, the operations further comprising:
processing a third input comprising the features, wherein at least one feature comprises a current heading of the agent, using a third machine learning model that is configured to generate a predicted offset from the current heading.

20. The system of claim 19, the operations further comprising:
combining the current heading and the predicted offset from the current heading to generate a projected path; and
generating, using the projected path, a projected exit point from a roadway.

* * * * *